United States Patent [19]

Falcoff et al.

[11] 4,403,866

[45] Sep. 13, 1983

[54] PROCESS FOR MAKING PAINTS

[75] Inventors: Allan F. Falcoff, Lake Orion, Mich.; Stephen W. Rementer, Toughkenamon, Pa.; Allan B. J. Rodrigues, Bloomfield Hills, Mich.

[73] Assignee: E. I. Du Pont de Nemours and Company, Wilmington, Del.

[21] Appl. No.: 376,233

[22] Filed: May 7, 1982

[51] Int. Cl.³ .......................... B01F 5/10; B01F 15/00; B01F 15/02
[52] U.S. Cl. ................................. 366/132; 366/136; 366/138; 366/142; 366/143; 366/145; 366/152; 366/160
[58] Field of Search ................... 73/53; 366/132, 136, 366/137, 138, 142, 143, 145, 152, 159, 160, 177, 179, 182, 184

[56] References Cited

U.S. PATENT DOCUMENTS

| | | | |
|---|---|---|---|
| 2,540,797 | 2/1951 | Stearns | 235/61 |
| 2,542,564 | 2/1951 | Park | 235/61 |
| 2,923,438 | 2/1960 | Logan et al. | 222/2 |
| 3,020,795 | 2/1962 | McKinney et al. | 88/14 |
| 3,059,524 | 10/1962 | Grassmann et al. | 73/53 |
| 3,368,864 | 2/1968 | Gugerli | 8/25 |
| 3,601,589 | 8/1971 | McCarty | 235/150 |
| 3,605,775 | 8/1971 | Zaander | 137/3 |
| 3,695,764 | 10/1972 | Delmas et al. | 356/97 |
| 3,916,168 | 10/1975 | McCarty et al. | 235/151.3 |
| 4,008,829 | 2/1977 | Chandra et al. | 222/63 |
| 4,209,258 | 6/1980 | Oakes | 366/152 |
| 4,212,545 | 1/1980 | Lovasz | 366/152 |
| 4,247,202 | 1/1981 | Failes | 356/310 |
| 4,272,824 | 6/1981 | Lewinger et al. | 366/152 |

FOREIGN PATENT DOCUMENTS

1589705 of 0000 United Kingdom .

OTHER PUBLICATIONS

Color Technology, M. M. Lih, Chemical Engineering, Aug. 12, 1968 pp. 146–156.
Use of Instrumental Color Readings, Cleveland Society for Coatings Technology Comm., Journal of Coatings Technology 48, No. 619 Aug. 1976, pp. 58–62.
Batch Color Correction by Tristimulus Colorimeter, S.U. Jenkins, Modern Paints and Coatings, Sep. 1980, pp. 41–44.
Geometric Metamerism, R. M. Johnston, Color Engineering May–Jun. 1967 pp. 42–47.
The Fibre Optics Colorimeter and its Applications, I. G. H. Ishak J. Oil Col. Assoc. 1971, 54, 129–140.
Color Vision and Assessment of Color Differences, A. B. J. Rodrigues Detroit Paint Society Conference May 5, 1981.
Theory and Implementation of Modern Techniques, A. B. J. Rodrigues, 5th Int. Conference Jul. 16–20, 1979.

*Primary Examiner*—Robert W. Jenkins
*Assistant Examiner*—Arthur D. Dahlberg
*Attorney, Agent, or Firm*—Hilmar L. Fricke

[57] ABSTRACT

An apparatus and process for automatically and rapidly making a paint having the color values of a standard paint; a computer is used which is connected to and controls a multiplicity of metering pumps that are each individually connected to a supply of components used to make the paint such as binder solution, solvent and colorants; the components are accurately metered into a mixing vessel and mixed, paint is circulated through a recycle loop attached to the vessel, the loop contains a cell having a viewing window through which the paint is pumped, a colorimeter views the cell and determines the color values of the wet paint and feeds these values back to the computer which compares the values to values of the standard paint and calculates the amount of colorant to be added and signals the metering pumps to add colorant, the process is repeated until the paint is brought within the tolerance values of the standard paint.

20 Claims, 1 Drawing Figure

PROCESS FOR MAKING PAINTS

BACKGROUND OF THE INVENTION

This invention is related to a process and apparatus for making paints that match a standard paint.

Early devices such as those illustrated in Logan et al. U.S. Pat. No. 2,923,438 issued Feb. 2, 1960 provided a method for making paints according to a given formula but did not provide means for color matching the paint to a standard except for visual color matching using estimated additions of colorants to match a standard.

McCarty U.S. Pat. No. 3,601,589, issued Aug. 24, 1971, and McCarty et al. U.S. Pat. No. 3,916,168, issued Oct. 28, 1975, are directed toward computer controlled methods for preparing paints but use the standard procedure of spraying panels with paint, baking the panels and measuring color value of the panels and calculating and reshading the paint to bring the paint within acceptable color tolerance values.

British Pat. No. 1,589,705, published May 20, 1981, describes a general process for making a paint and adjusting the color values of the paint to come within the color tolerance values of a standard paint. However, this method directly utilizes light scattering and optical absorption properties of colorants used in the paints in combination with reflectance values of the paint at several wavelengths to determine the quantity of colorants required to bring the paint within an acceptable standard. When this procedure is used with the equipment disclosed in the patent, it does not provide for accurate color matching of a paint to a standard color and does not lend itself to a totally automated paint matching process.

There is a need for a process and apparatus that automatically, rapidly and accurately dispenses and mixes binder, solvents and colorants for a paint based on a standard formula, measures color values of the paint and shades the paint to within color tolerance values for that paint. The process and apparatus of the invention accomplish the above.

SUMMARY OF THE INVENTION

An apparatus and process for making a paint that matches the color values of a standard liquid paint; the process utilizes the following: a computer electrically connected to a multiplicity of metering pumps, each pump is individually connected to a supply of a component used in the paint, the components used in the paint are liquid containing binder for the paint, solvent for the paint and colorant in the form of a dispersion or solution; a vessel that contains mixing means and a recycle loop; a pump that is tubularly connected to the vessel positioned in the recycle loop; a cell having a viewing window that is positioned in the recycle loop; a colorimeter having means to determine $L^*$, $a^*$ and $b^*$ values of the paint that is positioned to view the window of the cell and that is electrically connected to the computer; the entire process is controlled by the computer and has the following steps:

(1) providing the computer with
  (a) formula of the paint to be made,
  (b) $L^*$, $a^*$ and $b^*$ values of the liquid standard paint,
  (c) tolerance values of $L^*$, $a^*$ and $b^*$ for the paint;
(2) metering exact amounts of components of the paint into the mixing vessel by the metering pumps which are controlled by the computer;
(3) mixing the components to form a paint;
(4) circulating the paint through the cell at a uniform shear rate;
(5) measuring and determining the $L^*$, $a^*$ and $b^*$ values of the paint by the colorimeter;
(6) transmitting said $L^*$, $a^*$ and $b^*$ values to the computer;
(7) determining color vectors of each colorant used to formulate the paint by adding a known amount of each colorant and for each addition repeating steps (3)–(6) and determining change in $L^*$, $a^*$ and $b^*$ values;
(8) comparing by the computer the $L^*$, $a^*$ and $b^*$ values of the paint to the $L^*$, $a^*$ and $b^*$ values of the standard paint and calculating the difference between the values of the paint and the standard paint and calculating the quantity of components to be added to the paint to bring the paint within $L^*$, $a^*$ and $b^*$ tolerance values of the paint; and
(9) repeating Steps (2)–(6) and (8) at least once in the event the paint is not within the $L^*$, $a^*$ and $b^*$ tolerance values for the paint to bring the paint within said tolerance values.

If the color vectors for the colorants used to formulate the paint have been predetermined, the vectors are provided to the computer in Step (1) and Step (7) is omitted from the process.

BRIEF DESCRIPTION OF THE DRAWING

The FIGURE shows a schematic diagram of the process of this invention used to make paints that match a standard paint.

DESCRIPTION OF THE PREFERRED EMBODIMENTS

Figure 1:
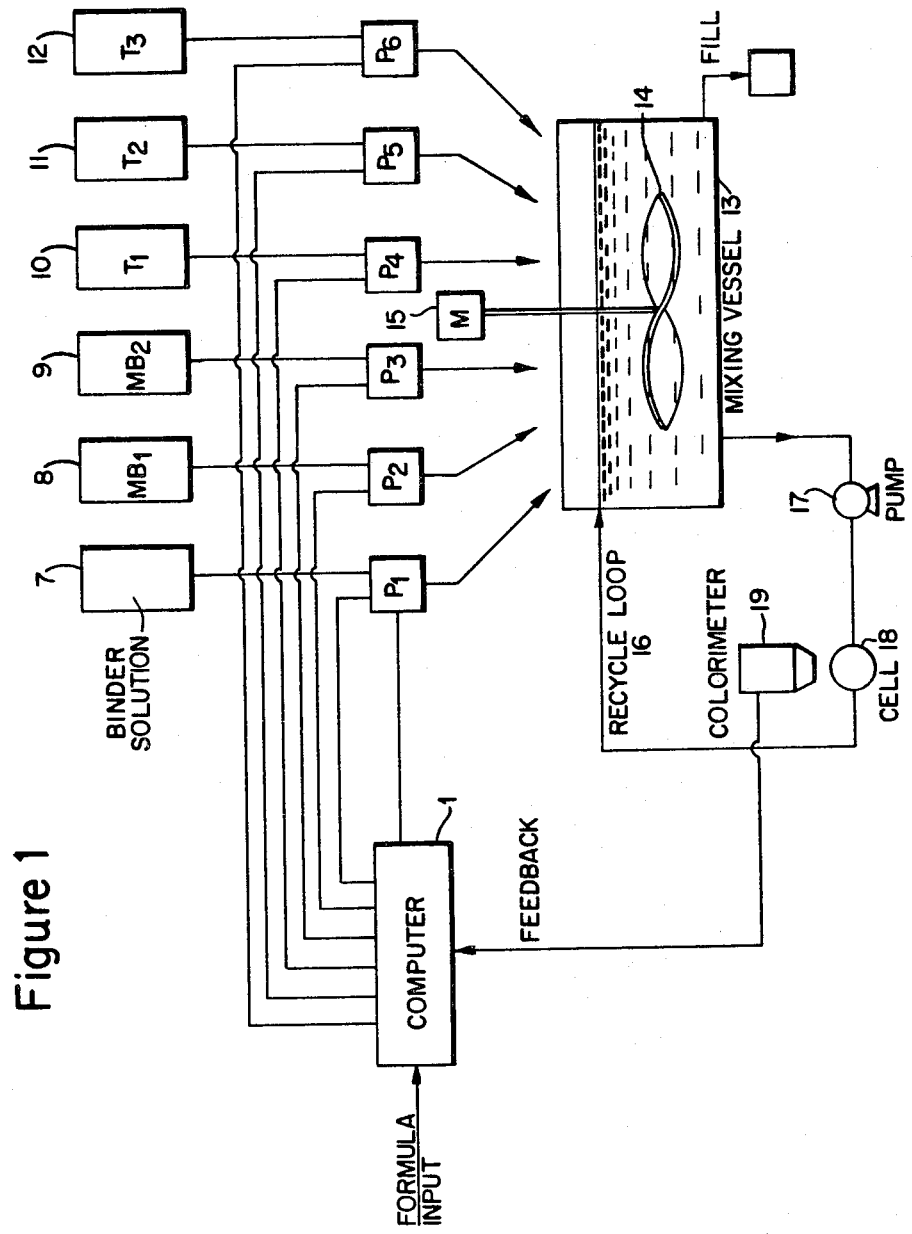

The process of this invention makes a paint having color values that accurately match the color values of a standard without manual calculations or additions of colorants or without operator intervention. This makes the process particularly attractive for use in a distribution center which supplies a large number of paint colors or for use in a paint plant manufacturing process.

In reference to the FIGURE, a digital computer 1 is provided. Typical computers that can be used are Intel SBC 8010B Micro-computer, National Semiconductor BLC 8014 Micro-computer or an Intel SBC 80 20 Micro-computer.

The formula for the paint which includes the amount of colorants, binder and optional solvents that are required to make a certain volume of a batch of paint is fed into the computer. The $L^*$, $a^*$ and $b^*$ values for the standard liquid paint and $L^*$, $a^*$ and $b^*$ tolerance values for the paint that is to be made are fed into the computer. If the color vector values of the colorant solution or dispersion are unknown, the color vector values of the colorant are generated by the computer by measuring the $L^*$, $a^*$ and $b^*$ values of a paint before and after an addition of a known amount of colorant and making the necessary calculations. If the color vector values of the colorants are known, these values are also fed into the computer so that the computer can calculate the amount of colorant that is required to bring the paint within color tolerance.

The color technology used in the process is well known and is fully discussed in F. W. Billmeyer and M. Saltzman, *Principles of Color Technology*, John Wiley and Sons, New York, 2nd Edition, (1981). Of particular interest is an article by A. B. J. Rodrigues in Fifth International Conference in Organic Coatings Science and Technology Proceedings, Vol. 3, *Advances in Organic Coatings Science and Technology Series,* "Theory and Implementation of Modern Techniques of Color Conception, Matching and Control", p. 272–282, (1979) which is hereby incorporated by reference.

The color of the paint is described in L*, a* and b* values which are coordinates in visual uniform color space and are related to X, Y & Z tristimulus values by the following equations which have been specified by the International Committee on Illumination:

L* defines the lightness axis $$L^* = 116(Y/Y_o)^{\frac{1}{3}} - 16$$

a* defines the red green axis $$a^* = 500[(X/X_o)^{\frac{1}{3}} - (Y/Y_o)^{\frac{1}{3}}]$$

b* defines the yellow blue axis $$b^* = 200[(Y/Y_o)^{\frac{1}{3}} - (Z/Z_o)^{\frac{1}{3}}]$$

where $X_o$, $Y_o$ and $Z_o$ are the tristimulus values of the perfect white for a given illuminant;

X, Y and Z are the tristimulus values for the color.

The color vectors for each of the colorants used to prepare the paint are provided and determined as discussed above. The color vector is the movement in color space, i.e., the change in the L*, a* and b* values caused by the addition of a unit amount of each colorant used. For example, $$\text{the color vectors for a color} = \begin{bmatrix} \partial L^*/\partial C_1 & \partial L^*/\partial C_2 & \partial L^*/\partial C_3 \\ \partial a^*/\partial C_1 & \partial a^*/\partial C_2 & \partial a^*/\partial C_3 \\ \partial b^*/\partial C_1 & \partial b^*/\partial C_2 & \partial b^*/\partial C_3 \end{bmatrix}$$

where $C_1$, $C_2$ and $C_3$ are the concentration of pigment or tint used in the color.

The metering pumps used in the process are electrically connected to and controlled by the computer and are tubularly connected to the components used to make the paint. The metering pumps preferably are computer controlled servo motor driven piston pumps. Computer controlled servo motor driven gear pumps can also be used. These computer controlled pumps can be programmed to be self-calibrating to insure accurate delivery of amounts of components used in the paint.

Referring to the FIGURE, metering pump $P_1$ is tubularly connected to a supply of the binder solution 7, $P_2$ is connected to a supply of a mill base 8 which is a pigment dispersion, $P_3$ to a second mill base 9, $P_4$ to a tinting solution 10, $P_5$ to a second tinting solution 11 and $P_6$ to a third tinting solution 12.

The components used to make the paint are metered into a mixing vessel 13 containing a mixer 14 having a mixing blade attached to a shaft and driven by a motor 15. The components are thoroughly mixed and circulated through a tubular recycle loop 16 by pump 17. Cell 18 for viewing the paint is connected in the recycle loop. It is preferred to use a variable speed mixer which is controlled by the computer to provide for sufficient mixing of each batch of paint and insure that mixing of the paint does not entrain air into the paint which causes a color shift in the wet paint.

The cell has a viewing window which is a medium that is transparent to the visible light spectrum and usually is made of quartz glass. Paint deposits can build-up on the window of the cell which results in inaccurate readings. The paint flow through the cell should be at a uniform shear rate to provide a constant interface that can be measured by the colorimeter 19 and at a sufficient velocity to prevent a build-up on the cell window. The color values of paints containing metallic flake pigments are particularly difficult to measure since the metallic flake pigments must be in alignment in a plane parallel to the surface of the window of the cell to obtain constant readings by the colorimeter.

The paint flow through the cell should be within the laminar flow region and have a Reynold's Number of at least 25 and preferably about 100 but should not be over 2000. Paint flow within this range of Reynolds Numbers provides for sufficient flow so that the cell will be self cleaning and prevents a paint build-up on the window. The paint flow at the cell window is laminar and allows for the aforementioned alignment of metallic flake pigments to provide for accurate color analysis of the paint.

A Reynold's Number is a dimensionless quantity that measures flow and is well known in the art. Assuming a circular cross sectional area for the channel where the paint flows through the cell, the Reynold's Number is $(4W)/(\pi DU)$ where W is the weight ratio of paint flow in grams/second, D is the diameter of the opening in centimeters and U is the viscosity of the paint in grams/centimeters second. When the cross sectional areas for the channel is not circular, the equivalent diameter is 2 times the square root of the cross sectional area divided by $\pi$.

A typical cell that can be used is disclosed in McKinney and Reilly U.S. Pat. No. 3,020,795, issued Feb. 13, 1962. Other cell designs can be used provided that the paint flows over the cell viewing window at the aforementioned Reynolds No. One solution to the problem of paint build-up on the cell wndow is the use of a fluorocarbon polymer coated quartz glass window in the cell. Also, an automatically activated wiper can be used to wipe the window of the cell before a reading is taken with the colorimeter.

Often the color shifts in a paint when the temperature of the paint changes. In a typical paint mixing process, the temperature of the paint increases and the paint should be cooled before the paint passes through the cell. To maintain the paint at a constant temperature, a conventional heat exchanger using chilled water for cooling can be used. Preferably, the heat exchanger is positioned before the cell to insure a constant temperature of the paint passing through the cell.

The colorimeter used in the process is electrically connected to the computer and preferably determines the L*, a* and b* values of the paint being prepared and feeds these values back to the computer. The colorimeter views the paint through the visible light spectrum of 400–700 nanometers (nm) for example, at 20 nm increments and calculates the L*, a* and b* values for the paint based on this data. It is possible to feed process signals from the colorimeter generated by viewing the paint to the computer and have the computer determine the L*, a* and b* values.

The computer takes these L*, a* and b* values and determines the difference between the L*, a* and b* values of the paint being prepared and tolerance values for the standard paint ($\Delta L^*$, $\Delta a^*$ and $\Delta b^*$). With the color vector information of the colorants and the $\Delta L^*$, $\Delta a^*$ and $\Delta b^*$, the computer determines the amount of each of the colorants that is to be added to bring the paint within the tolerance values for the paint and activates the metering pumps which feed colorants into the mixing vessel. The above procedure, commonly called shading, is repeated until the paint being prepared is within L*, a* and b* tolerance values of the paint.

After the paint is prepared, it can be filled into suitable containers either automatically or manually by using conventional filling equipment and procedures.

After a first batch of paint has been prepared, multiple batches of the same paint can be formulated without using the aforementioned shading procedure. This is accomplished by mixing the same quantity of each of the components used to formulate the paint that were used in the first batch.

Instruments can be included in the process which measure properties such as the hiding power of the paint, the viscosity and density of the paint. The data generated by these instruments is fed to the computer and calculations are made and additions of binder solution, solvents and colorants are adjusted to bring the paint within tolerances for the above properties.

The process can be used in a paint manufacturing process as well as for making small batches of paint in a paint distribution center. In a manufacturing process, the automatic feedback from the colorimeter to the computer can be eliminated. The L*, a* and b* values determined by the colorimeter can be manually fed into the computer at an appropriate time in the manufacturing process. The computer calculates the amounts of solvents, binder solution and colorants to be added to bring a batch of paint within the desired tolerances and the additions are made manually or automatically. With the small batch process, the computer generally is used to control additions solvents, binder solution and colorants to the paint being prepared.

It is possible to determine L*, a* and b* values of a color from a color styling similator as disclosed in Lee U.S. Pat. No. 4,048,493 issued Sept. 13, 1977 and either feed these values automatically or manually into the computer. The process then prepares a paint having the desired L*, a* and b* values. Generally, a color stylist using a color styling simulator to develop a paint color for an automobile or a truck can work with a wide range of color tolerances. Therefore, the difference between the color of the wet paint and the dry paint and the relationship between the color of the image projected on the simulator and the color of the resulting object are not significant. A stylist is able to develop an acceptable color on the simulator and feed the L*, a* and b* values of the color into the process of this invention and obtain an acceptable paint. One practical use for such a system would be to have a customer who desires to refinish an auto or truck choose a color on the styling simulator and have the paint made immediately to specification.

It is possible to determine a spectral curve of a color with a spectrophotometer and feed these values into the computer which contains a program which generates a paint formula from the curve. The process of this invention is then used to prepare a paint that matches the color. The aforementioned technique can be used to match a dry color or the color of a wet paint sample that has an unknown formula.

The computer can be programmed to direct and control the preparation of a multiplicity of paints. For example, the computer can be given five paint formulas. After the preparation of each paint, the system automatically washes the mixing vessel and recycle loop with an appropriate solvent and then the next paint is manufactured.

The following Example illustrates the invention. All parts and percentages are on a weight basis unless otherwise indicated.

EXAMPLE

A process as illustrated in the FIGURE was used to formulate a paint. A National Semiconductor BLC 80/10B, a computer controlled multispeed mixer driven via a Fiarchild Corp. Model T-5800 Digital-to-Pneumatic Transducer and a colorimeter that has excellent repeatability were used in the process.

A dark blue acrylic lacquer was formulated. The standard lacquer has the following values. The following paint values were supplied to the computer:

| (wet paint) | $L^* = 9.10$ | $a^* = 8.72$ | $b^* = -27.47$ |
|---|---|---|---|
| (dry paint) | $L^* = 6.74$ | $a^* = 9.79$ | $b^* = -27.40$ |

Tolerance values for L*, a* and b* are ±0.3.

The following starting formula was given to the computer:

| | |
|---|---|
| Titanium dioxide white pigment dispersion | 33.5 |
| Carbon black dispersion | 71.8 |
| Phthalocyanine green pigment dispersion | 126.6 |
| Phthalocyanine blue pigment dispersion | 1557.0 |
| Clear acylic resin solution | 7983.0 |
| Total | 9771.9 |

The above constituents were thoroughly mixed and color measurements are made. 30.3 grams of the white pigment dispersion was added and color measurements made which caused a color movement of $\Delta L^* = 4.42$, $\Delta a^* = 2.08$ and $\Delta b^* = -3.48$. These values are the white color vector values. Similarly, the green, black and blue color vector values were determined as above and the results are as follows:

| | Amount added (grams) | $\Delta L^*$ | $\Delta a^*$ | $\Delta b^*$ |
|---|---|---|---|---|
| Black | 70.0 | −0.99 | −1.77 | 3.22 |
| Green | 106.0 | −0.24 | −2.28 | 2.25 |
| Blue | 530.0 | −1.78 | 3.43 | −1.17 |

Color measurements were made on the above paint after the above addition of white, black, green and blue dispersions and the following differences from the standard were calculated by the computer:

$\Delta L^* = 0.05$, $\Delta a^* = 1.31$ and $\Delta b^* = -1.95$

Based on the above differences and the above color vector values, the computer calculated and dispensed the following and color measurements were made and differences from the standard were calculated:

| Additions | (grams) |
|---|---|
| Carbon Black dispersion | 39.4 |
| Phathalocyanin green pigment dispersion | 33.8 |

The color differences of the resulting paint from the above standard paint were determined and are as follows:

$$\Delta L^* = -0.17, \Delta a^* = -0.10 \text{ and } \Delta b^* = -0.19$$

These values are within the aforementioned tolerance values for L*, a* and b*.

The resulting paint was sprayed onto a primed steel panel and baked under standard conditions and the color values were determined and color differences of the dry paint from the above standard dry paint were calculated and are as follows:

$$\Delta L^* = 0.16, \Delta a^* = -0.16 \text{ and } \Delta b^* = -0.07$$

These values are within the aforementioned tolerance values for L*, a* and b*. An acceptable paint was formulated.

As a second example, a light salmon polyurethane enamel was formulated using the above process.

The standard enamel has the following values which were supplied to the computer:

Wet paint $L^* = 79.54$, $a^* = 2.58$ and $b^* = 6.28$

Dry tolerance values for L*, a* and b* are ±0.2.

The following starting formula was provided to the computer:

|  | (grams) |
| --- | --- |
| Yellow from Oxide Dispersion | 10.4 |
| Red Iron Oxide Dispersion | 35.5 |
| Carbon Black Dispersion | 0.0 |
| Titanium Dioxide White Pigment Dispersion | 11258.6 |
| Total | 11304.5 |

The above constituents were thoroughly mixed and the following color difference from the standard were calculated.

$$\Delta L^* = 3.26, \Delta a^* = -2.04 \text{ and } \Delta b^* = -2.05$$

Color vectors for the above dispersions were predetermined and are as follows:

|  | Weight per 100 grams | ΔL* | Δa* | Δb* |
| --- | --- | --- | --- | --- |
| Yellow Iron Oxide Dispersion | 0.25 | −0.46 | −0.30 | +2.69 |
| Red Iron Oxide Dispersion | 0.76 | −1.09 | +1.35 | +0.15 |
| Carbon Black Dispersion | 0.11 | −0.61 | −0.14 | −0.43 |
| Titanium Dioxide White Pigment Dispersion | 25.2 | +0.58 | −0.19 | −0.67 |

Based on the above color differences and the above color vectors, the following additions of dispersions were calculated by the computer and these amounts were added and color differences from the standard enamel were calculated after each addition of pigment and dispersion:

| Add | Amount Added (grams) | ΔL* | Δa* | Δb* |
| --- | --- | --- | --- | --- |
| No. 1 |  |  |  |  |
| Yellow Iron Oxide Dispersion | 57.2 |  |  |  |
|  |  | 0.24 | 0.51 | 0.25 |
| Red Iron Oxide Dispersion | 47.2 |  |  |  |
| No. 2 |  |  |  |  |
| Red Iron Oxide Dispersion | 17.3 |  |  |  |
|  |  | 0.27 | −0.27 | −0.07 |
| Carbon Black Dispersion | 11.6 |  |  |  |
| Titanium Dioxide White Pigment Dispersion | 2155.2 |  |  |  |
| No. 3 |  |  |  |  |
| Red Iron Oxide Dispersion | 6.9 | 0.02 | 0.03 | −0.07 |

After addition No. 3, the color differences were within the aforementioned tolerances values for L*, a* and b*.

The resulting paint was sprayed onto a primed steel panel and baked under standard conditions and the color values were determined and the color differences of the dry paint were calculated and are as follows:

$$\Delta L^* = 0.16, \Delta a^* = -0.16 \text{ and } \Delta b^* = -0.07$$

These values are within tolerance values and the paint was acceptable.

We claim:

1. A process for making a paint that matches the color values of a standard liquid paint, said process utilizes a computer electrically connected to a multiplicity of metering pumps, each pump being individually connected to a supply of a component used in the paint, said components used in the paint being liquid containing binder for the paint, solvent for the paint and colorant in the form of dispersions or solutions, a vessel containing a recycle loop and mixing means, a pump tubularly connected to the vessel positioned in a recycle loop, a cell having a viewing window positioned in the recycle loop, a colorimeter having means to determine L*, a* and b* values of the paint positioned to view the window of the cell and being electrically connected to the computer, said process being controlled by the computer comprises the following steps:
    (1) providing the computer with
        (a) formula of the paint,
        (b) L*, a* and b* values of the liquid standard paint,
        (c) tolerance values of L*, a* and b* for the paint;
    (2) metering exact amounts of components of the paint into the mixing vessel by the metering pumps which are being controlled by the computer;
    (3) mixing said components to form a paint;
    (4) circulating the paint through said cell at a uniform shear rate;
    (5) measuring and determining L*, a* and b* values of the paint with the colorimeter;
    (6) transmitting said L*, a* and b* values to the computer;
    (7) determining color vectors of each colorant used to formulate said paint by adding a known amount of each colorant to the paint and for each addition repeating Steps (3)–(6) and determining the change in L*, a* and b* values;

(8) comparing by the computer the L*, a* and b* values of the paint to the L*, a* and b* values of the standard paint and calculating the difference between the values of the paint and the standard paint, and calculating the quantity of components to be added to the paint to bring the paint within L*, a* and b* tolerance values of the paint; and (9) repeating steps (2)–(6) and (8) at least once in the event the paint is not within the L*, a* and b* tolerance values for the paint to bring the paint within these tolerance values.

2. The process of claim 1 in which the color vector values of each of the colorants are known and are provided to the computer in Step (1) thereby eliminating Step (7) of the process.

3. The process of claim 1 or 2 in which the paint is maintained at a constant temperature before entering the cell.

4. The process of claim 1 or 2 in which the paint is circulated through the cell at a flow having a Reynolds Number of at least 25.

5. The process of claim 1 or 2 in which the metering pumps are servo motor controlled piston pumps.

6. The process of claim 1 or 2 in which the metering pumps are servo motor controlled gear pumps.

7. The process of claim 4 in which one of the components of the paint contains metallic flake pigments.

8. The process of claim 4 which includes measuring devices that provide the computer with the hiding, viscosity and density values of the standard paint and means for measuring and adjusting the hiding, viscosity and density of the paint.

9. The process of claim 1 or 2 which includes a final step of automatically filling containers after said paint has been prepared.

10. The process of claim 1 or 2 in which the computer is programmed to automatically prepare a multiplicity of paints which includes a step of washing the vessel, recycle loop and cell.

11. The process of claim 1 or 2 in which step (9) in which components are metered manually into the mixing vessel adding amounts of components as calculated in step (8).

12. The process of claim 1 or 2 in which a spectrophotometer which measures a spectral curve of a color sample is electrically connected to the computer which determine the L*, a* and b* values from the spectral curve and transmits these values to the computer and tolerance values are transmitted to the computer and the process prepares a paint within the L*, a* and b* tolerance values.

13. The process of claim 1 or 2 in which the L*, a* and b* values determined from a spectral curve of a color and tolerance values for the paint are transmitted to the computer and the process prepares a paint within tolerance values.

14. The process of claim 1 or 2 in which an operator determines a color by a color styling simulator which visually shows a color, provides L*, a* and b* value data, is electrically connected to the computer, transmits such data to the computer and transmits tolerance values to the computer and the process prepares a paint within the L*, a*, b* tolerance values.

15. An apparatus for making paint that matches the color of a standard paint which comprises:

(1) a computer;

(2) individual vessels each containing components used in making paints, said components being liquid containing binder for the paint and colorant in the form of dispersions or solutions;

(3) a multiplicity of metering pumps tubularly connected to the vessels containing components for said paint and electrically connected to and controlled by the computer;

(4) a vessel containing mixing means into which the components for the paint are fed and mixed;

(5) a tubular recycle loop attached to the vessel in which paint is removed from the vessel and circulated back into the vessel;

(6) a pump positioned in the recycle loop for pumping paint through the loop;

(7) a cell having a viewing window positioned in the recycle loop and designed to provide a uniform film of liquid paint on the viewing window; and (8) a colorimeter positioned to view the window of the cell electrically connected to the computer and having means to determine L*, a* and b* values of the paint;

wherein the computer is provided a formula of the paint, the L*, a* and b* values of a standard paint, tolerance values of L*, a* and b* for the paint, and is provided with or determines color vectors of the colorant dispersion or solutions; in making the paint the metering pumps controlled by the computer charge exact amounts of components used in the paint into the mixing vessel, the components are mixed in the vessel and circulated through the recycle loop and the cell in the loop, the colorimeter views the paint through the cell window and determines the L*, a* and b* values of the paint, the values are fed to the computer which compares these values to the values for the standard paint and calculates the difference between the values of the paint and the standard paint and calculates the quantity of each component to be added to the paint to bring the paint within the tolerance L*, a* and b* values of the paint and in the event the paint is not within said tolerance values repeats at least once the procedure for making the paint until the paint is within the predetermined tolerances of L*, a* and b* values of the paint.

16. The apparatus of claim 15 which contains means for maintaining the paint at a constant temperature before the paint flows through the cell.

17. The apparatus of claim 15 in which the metering pumps are servo motor controlled piston pumps.

18. The apparatus of claim 15 which includes means for measuring and adjusting the hiding, viscosity and density of the paint.

19. The apparatus of claim 15 which includes means for filling containers after the paint is made.

20. The apparatus of claim 15 in which the metering pumps are servo motor controlled gear pumps.

* * * * *